US010790950B2

(12) United States Patent
Fischer (10) Patent No.: US 10,790,950 B2
(45) Date of Patent: Sep. 29, 2020

(54) METHOD FOR INFORMATION TRANSMISSION IN A COMMUNICATION NETWORK

(71) Applicant: SIEMENS MOBILITY GMBH, Munich (DE)

(72) Inventor: Harald Fischer, Fuerth (DE)

(73) Assignee: Siemens Mobility GmbH, Munich (DE)

( * ) Notice: Subject to any disclaimer, the term of this patent is extended or adjusted under 35 U.S.C. 154(b) by 65 days.

(21) Appl. No.: 16/072,595

(22) PCT Filed: Dec. 13, 2016

(86) PCT No.: PCT/EP2016/080741
§ 371 (c)(1),
(2) Date: Jul. 25, 2018

(87) PCT Pub. No.: WO2017/129304
PCT Pub. Date: Aug. 3, 2017

(65) Prior Publication Data
US 2019/0068340 A1 Feb. 28, 2019

(30) Foreign Application Priority Data
Jan. 25, 2016 (DE) .......................... 10 2016 200 964

(51) Int. Cl.
*H04L 5/00* (2006.01)
*H04L 29/06* (2006.01)
(Continued)

(52) U.S. Cl.
CPC ......... *H04L 5/0048* (2013.01); *H04B 17/318* (2015.01); *H04L 12/4625* (2013.01);
(Continued)

(58) Field of Classification Search
None
See application file for complete search history.

(56) References Cited

U.S. PATENT DOCUMENTS

| 5,894,478 A | 4/1999 | Barzegar et al. |
| 6,278,710 B1 * | 8/2001 | Eidson ...................... G06F 1/14 370/394 |

(Continued)

FOREIGN PATENT DOCUMENTS

| DE | 10142408 A1 | 4/2003 |
| DE | 102004008910 A1 | 9/2005 |
| JP | 2008294503 A | 12/2008 |

OTHER PUBLICATIONS

Internet Protocol; Darpa Internet Program, Protocol Specification; Sep. 1981; IETF (RFC 0791).

*Primary Examiner* — Duc T Duong
(74) *Attorney, Agent, or Firm* — Laurence Greenberg; Werner Stemer; Ralph Locher (57) ABSTRACT

A method for achieving reliable information transmission in a communications network includes using a signal conditioning unit to receive a primary signal over at least one transmission channel, using the signal conditioning unit to generate a secondary signal from the primary signal and using the signal conditioning unit to transmit the secondary signal to a signal processing unit via two different protocol layers. A communications network includes a signal conditioning unit and a signal processing unit. The signal conditioning unit is configured to receive a primary signal over at least one transmission channel, to generate a secondary signal from the primary signal and to transmit the secondary signal to the signal processing unit via two different protocol layers.

17 Claims, 2 Drawing Sheets

(51) Int. Cl.
*H04B 3/36* (2006.01)
*H04L 12/46* (2006.01)
*H04B 17/318* (2015.01)
*H04L 29/08* (2006.01)

(52) U.S. Cl.
CPC .............. *H04L 69/14* (2013.01); *H04L 69/18* (2013.01); *H04L 67/12* (2013.01); *H04L 69/26* (2013.01)

(56) References Cited

U.S. PATENT DOCUMENTS

| | | | | |
|---|---|---|---|---|
| 6,314,520 | B1* | 11/2001 | Schell | G06F 21/82 726/13 |
| 6,421,735 | B1* | 7/2002 | Jung | H04L 29/06 709/220 |
| 7,474,015 | B2 | 1/2009 | Enders et al. | |
| 7,983,250 | B2 | 7/2011 | Enders et al. | |
| 8,456,278 | B1* | 6/2013 | Bergman | H04L 69/18 340/5.8 |
| 2006/0031378 | A1* | 2/2006 | Vallapureddy | A61B 5/0031 709/208 |
| 2007/0123239 | A1* | 5/2007 | Leigh | H04M 3/56 455/416 |
| 2007/0152107 | A1 | 7/2007 | Lefebvre et al. | |
| 2008/0133051 | A1* | 6/2008 | Wallace | B65G 43/00 700/230 |
| 2009/0094492 | A1* | 4/2009 | Music | G06F 11/261 714/715 |
| 2010/0254345 | A1 | 10/2010 | Raravi et al. | |
| 2012/0317282 | A1 | 12/2012 | Kraeling et al. | |
| 2012/0323409 | A1* | 12/2012 | Wellbrook | G06F 13/4072 701/3 |
| 2013/0118809 | A1* | 5/2013 | Veeningen | E21B 47/02 175/45 |
| 2013/0342362 | A1 | 12/2013 | Martin | |
| 2014/0129061 | A1* | 5/2014 | Cooper | B61C 17/12 701/19 |
| 2014/0156135 | A1 | 6/2014 | Maki et al. | |
| 2014/0241282 | A1 | 8/2014 | Mueller et al. | |
| 2015/0046613 | A1* | 2/2015 | Hurd | H04L 49/00 710/105 |
| 2015/0271793 | A1* | 9/2015 | Fischer | H04B 10/25752 455/450 |
| 2015/0278140 | A1* | 10/2015 | Motos | G06F 13/4022 710/317 |
| 2015/0312350 | A1* | 10/2015 | Kauppila | H04J 3/0638 709/248 |
| 2016/0072549 | A1* | 3/2016 | Kumar Kn | H04B 3/46 375/228 |

* cited by examiner

FIG 1

METHOD FOR INFORMATION TRANSMISSION IN A COMMUNICATION NETWORK

BACKGROUND OF THE INVENTION

Field of the Invention

The invention relates to a method for information transmission in a communications network. The invention further relates to a communications network.

If a communications network is used in a field with safety requirements, it is conventionally necessary for information or data to be reliably transmitted in the communications network. It may for example be necessary for information to be transferred in a maximally error- or trouble-free manner from a signal-generating unit to a signal-processing unit so as to ensure that the signal-processing unit processes correct or uncorrupted information.

One example of a field of use with safety requirements which may make reliable information transmission necessary is railway transportation. In railway transportation, it may for example be necessary reliably to transfer information relating to the state of a rail vehicle, such as for example information relating to a truck parameter, in particular for reasons of passenger safety.

SUMMARY OF THE INVENTION

One object of the invention is to provide a method with which information may be reliably transmitted in a communications network.

Said object is achieved according to the invention by the following method:

The method according to the invention for information transmission in a communications network makes provision for a primary signal to be received by a signal conditioning unit via at least one transmission channel, for a secondary signal to be generated from the primary signal by the signal conditioning unit and for the secondary signal to be transmitted to a signal processing unit by the signal conditioning unit via two different protocol layers.

Advantageous developments of the method according to the invention respectively constitute the subject matter of dependent claims and of the following description.

The invention is based on the consideration that, in the event of signal transmission via a first protocol layer and signal transmission via a second protocol layer different from the first protocol layer, there is in each case a different probability of undesired signal interference as a result of the different modes of transmission.

Furthermore, the invention is based on the consideration that undesired signal interference which takes place in the context of signal transmission via a first protocol layer preferably does not lead to any signal interference or to different signal interference in the context of signal transmission via a second protocol layer.

Undesired interference with regard to the secondary signal generated by the signal conditioning unit and which takes place in the context of transmission of the secondary signal via a protocol layer may be identified by the signal processing unit when the secondary signal is transferred to the signal processing unit via a further protocol layer. As a result of the signal transmission via two different protocol layers, it may be ensured that the signal processing unit is able to identify corrupted information in the secondary signal, for example by comparison of information of the secondary signal received via the first protocol layer with information of the secondary signal received via the further protocol layer. In this way, the processing of corrupted information by the signal processing unit may be avoided. Thus, information may be transmitted more safely and/or reliably in the communications network.

The secondary signal may be understood to be a signal generated and/or conditioned by the signal conditioning unit. A signal which is generated by a device other than the signal conditioning unit may, on the other hand, be understood to be the primary signal.

The communications network is preferably operated according to the rules of a protocol stack. In other words, the elements of the communications network preferably exchange information with one other according to the rules of a protocol stack.

The above-stated protocol layers are conveniently different layers (communications or network protocols) of the protocol stack. The protocol stack preferably comprises seven protocol layers. These seven protocol layers may in particular be the following seven protocol layers—physical layer (layer 1), data link layer (layer 2), network layer (layer 3), transport layer (layer 4), session layer (layer 5), presentation layer (layer 6) and application layer (slice 7)—defined by the OSI model (Open Systems Interconnection model).

The signal conditioning unit may in particular be a "repeater" (also known as a "regenerator"). The signal conditioning unit may thus in particular be configured to amplify the primary signal.

The signal processing unit is advantageously configured to evaluate and/or process the secondary signal, in particular useful information of the secondary signal, for example so as to monitor and/or control a technical process. For the purposes of signal processing, the signal processing unit advantageously has a programmable processor.

The signal processing unit and the signal conditioning unit are conveniently elements of the communications network. It is moreover convenient for the following stated devices to be elements of the communications network.

The communications network may in particular be a combination of a wireless network and a wired or conducted network. In other words, the communications network may on the one hand have components which transmit information wirelessly and on the other hand components which transmit information in a wired or conducted manner.

Advantageously, the communications network is a self-configuring communications network, i.e. the communications network advantageously performs automatic configuration of its elements.

The communications network or at least one element thereof may for example be a component of a rail vehicle control system (of a rail vehicle control and protection system). In such a case, information may be reliably transmitted in a rail vehicle by way of the communications network.

The secondary signal is conveniently transmitted by the signal conditioning unit via one of the two protocol layers in the form of a first protocol data unit to the signal processing unit. It is moreover advantageous for the secondary signal to be transmitted to the signal processing unit by the signal conditioning unit via the other one of the two protocol layers in the form of a second protocol data unit which is different from the first protocol data unit.

At least one of the two protocol data units may comprise addressing information, such as for example a destination address and/or a source address. A source address in particular makes a signal path traceable.

A destination address may here be understood to mean an address or identifier of that device for which a signal or information contained therein is intended. A source address may be understood to mean an address or identifier of that device from which this signal is transmitted.

It is preferable for the secondary signal to be transmitted bit-by-bit to the signal processing unit via one of the two protocol layers. This protocol layer is conveniently the "physical layer" (1st layer) of the OSI model. Such signal transmission may be achieved inexpensively.

It is moreover preferable for the secondary signal to be transmitted packet-by-packet to the signal processing unit via the other one of the two protocol layers. This protocol layer is in turn conveniently the "network layer" (3rd layer) of the OSI model.

The secondary signal may thus be transmitted to the signal processing unit in the form of data packets via one of the two protocol layers and coded in bits via the other one of the two protocol layers.

Signal transmission in the form of data packets may be advantageous inter alia because in this type of signal transmission a lower probability of undesired signal interference may be achieved (compared with another type of signal transmission). The reason for this is that, in signal transmission in the form of data packets, the signal or the information does not have to be loaded into a data memory of the signal conditioning unit before the signal can be forwarded. In this way, undesired signal interference caused in the data memory may in turn be avoided.

The signal processing unit preferably compares useful information of the secondary signal received via the first of the two protocol layers with useful information of the secondary signal received via the second of the two protocol layers. In this way, it may be identified whether the secondary signal was interfered with or corrupted during transmission via one of the two protocol layers.

Provision may be made for parts of the useful information predetermined by the signal processing unit to be compared with one another or for the items of useful information to be compared with one another in their entirety.

In the case of the useful information or of defined parts of the useful information corresponding, one of the items of useful information is conveniently processed by the signal processing unit. Otherwise, the useful information is conveniently discarded. "Discard" may here mean that the useful information is no longer used or processed (once comparison has been performed). Alternatively, in the case of the useful information not corresponding, provision may be made for the signal processing unit to process only the useful information from the secondary signal received by the higher one of the two protocol layers, while the other useful information is discarded.

The processing of useful information by the signal processing unit may in particular comprise use of the useful information for monitoring and/or control of a technical process.

In principle, the respective useful information may be information composed of a plurality of individual items of information.

The respective useful information may for example comprise a control command and/or a measured value. Furthermore, the respective useful information may comprise time information (a time stamp) and/or addressing information.

Advantageously, the at least one transmission channel is a wireless transmission channel, in particular a radio transmission channel. In other words, the signal conditioning unit receives the primary signal advantageously via a wireless transmission channel. This enables communication between the unit which generates the primary signal and the signal conditioning unit in fields of use in which a wired or conducted connection between said two units is not desired or is disadvantageous. A wired or conducted connection between the latter units may be disadvantageous for example for reasons of weight, or because such a wired or conducted connection can only be achieved in a cost- and/or labor-intensive manner.

It is particularly preferable for the transmission channel to be a standard transmission channel, such as for example Bluetooth, WLAN, ZigBee or 866 MHz radio. This has the advantage that the correspondingly necessary hardware components for such a transmission channel have been proven many times over and are inexpensive to obtain. In principle, however, the transmission channel may also be a non-standard transmission channel.

According to a preferred embodiment of the invention, the secondary signal is transmitted in a wired manner, in particular via a bus or a bus system, by the signal conditioning unit to the signal processing unit.

Generation of the secondary signal from the primary signal conveniently comprises signal amplification of the primary signal. In other words, when the secondary signal is generated, amplification, in particular electronic amplification, of the primary signal may take place, inter alia. This means that a conditioned signal, i.e. the secondary signal, is conveniently generated from the primary signal by signal amplification. In this way, it may be ensured that the secondary signal provided by the signal conditioning unit does not fall below a minimum signal strength required for the signal processing unit.

It is moreover convenient for at least part, preferably all, of the information contained in the primary signal to be contained in the secondary signal. The secondary signal may furthermore comprise additional information not contained in the primary signal, which information is generated by the signal conditioning unit. The secondary signal may for example comprise an address/identifier of the signal conditioning unit as source address and/or an address/identifier of the signal processing unit as destination address. The secondary signal may thus be understood to be an amplified primary signal with optional additional information.

It is furthermore advantageous if the secondary signal comprises at least one item of time information (a time stamp) generated by the signal conditioning unit, in particular a receive time for the primary signal. This time information may be taken into account by the signal processing unit when processing the secondary signal.

Moreover, the secondary signal may contain a transmit time, at which the signal conditioning unit transmits the secondary signal.

According to one advantageous development of the invention, the signal processing unit is a train control device.

In another advantageous development of the invention, the signal processing unit is an actuator. The actuator may be understood to mean a device which is capable of converting an electrical signal into a mechanical movement or into another physical variable, such as for example pressure or temperature, in particular in order thereby to intervene actively in a process. In this case, the primary signal is preferably generated by a control device, in particular by a train control device. The primary signal may further comprise at least one control command for the actuator. The actuator may for example be arranged on a rail vehicle truck.

One advantageous embodiment of the invention provides that the secondary signal is generated using a sensor. In such a case, the primary signal may comprise a measured value detected by means of the sensor. Furthermore, the primary signal may comprise time information about a measurement time, i.e. a time at which the measured value was recorded. The measured value and/or the time information may be useful information of the primary signal.

The sensor may for example be arranged on a rail vehicle truck. In this way, the sensor may be used in particular for monitoring a truck parameter. The sensor may for example be a temperature sensor, a rotational speed sensor or another type of sensor.

The sensor conveniently generates a sensor signal, which may in particular contain the measured value and/or said time information about the measurement time. The sensor signal is conveniently routed to a transmit unit, optionally after signal processing, such as for example digitization. The primary signal is preferably based on the sensor signal or the primary signal corresponds to the sensor signal. It is moreover convenient for the transmit unit to transmit the primary signal. The transmit unit may in particular be a transceiver, i.e. a combined transmit and receive unit.

Individual or all of the components of the communications network are preferably supplied with electrical power by means of a reliable power supply, which may in particular have a plurality of power sources. Advantageously, the power supply comprises an uninterruptible power supply unit. In this way, components of the communications network can be reliably supplied with electrical power even in the case of the power supply malfunctioning.

In addition, the power supply may comprise one or more twisted-pair wires. This for example enables communications via a PROFINET bus. The power supply may preferably be used for data/signal transmission instead of said transmission channel in the event of failure of or a defect in the transmission channel.

Provision may further be made for a primary signal to be emitted by a transmit module via each of a plurality of different transmission channels, in particular wireless transmission channels. The use of a plurality of different transmission channels here has the advantage that, in the case of a malfunction or a failure of one of these transmission channels, information may be transferred between the transmit module and a signal-receiving unit, such as for example the signal conditioning unit, via the other transmission channels.

The primary signals emitted via the different transmission channels may correspond with regard to their useful information, i.e. each of these primary signals may have the same useful information. The primary signals may each be signals with identical content. The different transmission channels may thus be used for redundant transmission of the primary signal. In this way, the same useful information may be transferred to a signal-receiving unit via one of the other transmission channels in the case of malfunctioning or failure of one of these transmission channels.

In particular, all of these primary signals may have been generated from the same sensor signal or by the same control device. The secondary signal is conveniently generated by the signal conditioning unit from one of these primary signals.

Preferably, information about different frequencies, in particular different radio frequencies, are transmitted via the different transmission channels. Since signal-carrying waves which differ in frequency typically exhibit different reflection behaviors, it is possible in this way, by exploiting the different reflection behaviors, to achieve a higher probability that at least one of the primary signals is transferred to a signal-receiving unit, such as for example the signal conditioning unit.

In one advantageous development of the invention, the transmit module changes a carrier frequency of its respective transmission channel at predetermined intervals. The transmit module may thus perform "frequency hopping". In this way, information transmission may proceed more robustly relative to (narrow-band) malfunctions.

In addition, the transmit module may have a separate transmit unit, in particular a combined transmit and receive unit, for each of the transmission channels.

Furthermore, the signal conditioning unit may receive a plurality of primary signals from one transmit module, in particular from the above-stated transmit module, preferably in each case via a separate transmission channel, in particular in each case via a separate wireless transmission channel. The use of a plurality of different transmission channels has the advantage that, in the case of a malfunction or a failure of one of these transmission channels, information transfer from the transmit module to the signal conditioning unit may (continue to) be performed via the other transmission channels.

These primary signals may for example correspond in their time information (time stamps). In particular, the primary signals may have the same signal generation time, i.e. the primary signals may have been generated at the same time. Furthermore, the primary signals may correspond fully in their useful information. The primary signals may each be signals with identical content.

The secondary signal is conveniently generated from the one of these primary signals for which the signal conditioning unit identifies the greatest signal strength. This makes it possible to ensure that the secondary signal is generated from that one of the primary signals which has the highest signal-to-noise ratio. In the present case, an amplitude of the respective primary signal or a field strength of the respective primary signal, in particular at the location of the signal conditioning unit, may be understood as the signal strength. Provision may furthermore be made for the secondary signal to be generated from that one of these primary signals which the signal conditioning unit receives first.

If one of the primary signals or information contained therein exceeds a specified age, this primary signal is preferably discarded and thus not used to generate the secondary signal.

Furthermore, provision may be made for the same primary signal to be received by a plurality of signal conditioning units in each case via at least one transmission channel, in particular via at least one radio transmission channel, and for a secondary signal to be generated from the received primary signal. Redundancy of the communications network may be achieved by the use of a plurality of signal conditioning units. In the case of a malfunction or a failure of one of the signal conditioning units, useful information contained in the primary signal may be transmitted to the signal processing unit via one of the other signal conditioning units.

The secondary signals generated by the respective signal conditioning unit may furthermore be transmitted by the corresponding signal conditioning unit via two different protocol layers to the signal processing unit.

Preferably, the signal processing unit processes the one of these secondary signals which the signal processing unit receives first. It may furthermore be provided that the signal processing unit compares the useful information of these secondary signals. In this case, it is advantageous for the signal processing unit to process the useful information from one of these (only) when the useful information of at least two secondary signals corresponds. By way of this additional comparison, undesired signal interference between one of the signal conditioning units and the signal processing unit may be identified.

The communications network according to the invention comprises a signal conditioning unit and a signal processing unit. The signal conditioning unit is designed to receive a primary signal via at least one transmission channel, to generate a secondary signal from the primary signal and to transmit the secondary signal to the signal processing unit via two different protocol layers.

Advantageous developments of the communications network according to the invention respectively constitute the subject matter of dependent claims and of the following description.

Furthermore, the advantageous features mentioned further above in relation to the method also relate to advantageous developments of the communications network according to the invention. Conversely, the advantageous features mentioned below in relation to the communications network also relate to advantageous further developments of the method according to the invention.

Conveniently, the communications network according to the invention is set up to carry out the method according to the invention, in particular to carry out at least one of the above-described advantageous further developments of the method according to the invention.

The communications network may for example be a component of a vehicle, such as for example a rail vehicle. The communications network may in particular be a component of a control system or a control and protection system of a rail vehicle.

Advantageously, the signal conditioning unit is configured to receive said primary signal via a wireless transmission channel, in particular via a radio transmission channel.

The signal conditioning unit is preferably configured to receive a primary signal in each case via a plurality of different wireless transmission channels, in particular radio transmission channels. To this end, the signal conditioning unit may have a plurality of different receive units, in particular radio receive units. These receive units may for example each take the form of a transceiver, i.e. a combined transmit and receive unit.

It is moreover preferable for the signal conditioning unit to be configured to identify a signal strength of the respective primary signal and/or a receive time of the respective primary signal.

The signal conditioning unit is conveniently operable as a switch and/or as a router. In other words, the signal conditioning unit conveniently has a switch and/or router function.

It is moreover advantageous for the communications network to have at least one transmit module. The transmit module is preferably configured to emit a primary signal in each case via a plurality of different wireless transmission channels, in particular radio transmission channels.

The transmit module may have a separate transmit unit for each of the transmission channels. These transmit units may for example each take the form of a transceiver, i.e. a combined transmit and receive unit.

The description given hitherto of advantageous embodiments of the invention includes numerous features which are reproduced in the individual subclaims, in some cases in combination with one another. These features may however conveniently also be considered individually and combined into meaningful further combinations. In particular, these features can each be combined individually and in any desired suitable combination with the method according to the invention and the communications network according to the invention. For example, method features, substantively worded, may also be considered as characteristics of the corresponding device unit and vice versa.

Although some terms are used in the description or in the claims in each case in the singular or in conjunction with a number, the scope of the invention is not intended to be restricted by these terms to the singular or the respective number.

The above-described characteristics, features and advantages of the invention and the manner in which these are achieved will become clearer and more distinctly comprehensible from the following description of the exemplary embodiments of the invention, which are explained in greater detail in connection with the drawings. The exemplary embodiments serve to explain the invention and do not limit the invention to the combinations of features stated therein, not even in respect of functional features. Moreover, suitable features of each exemplary embodiment may also explicitly be considered in isolation, eliminated from one exemplary embodiment, incorporated into another exemplary embodiment in order to complete it and combined with any desired one of the claims.

DESCRIPTION OF THE INVENTION

Figure 1:
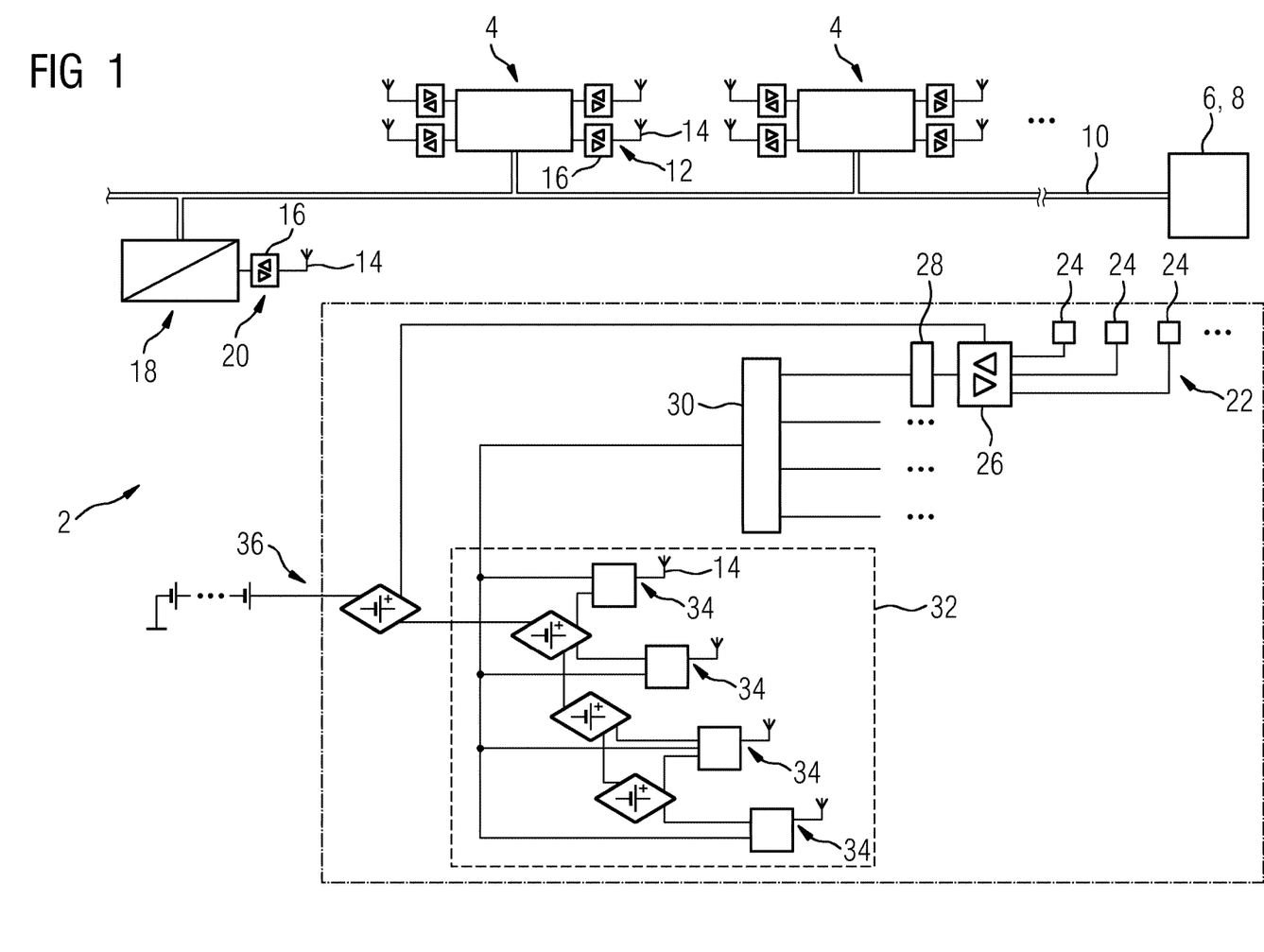
FIG. 1 shows a communications network, which comprises inter alia a plurality of signal conditioning units, a plurality of sensors and a signal processing unit configured as a train control device.

FIG. 1 shows a schematic diagram of a communications network 2. The communications network 2 shown is a communications network of a rail vehicle.

The communications network 2 comprises a plurality of signal conditioning units 4, wherein, for greater clarity, FIG. 1 shows just two of the signal conditioning units 4.

Moreover, the communications network 2 comprises a signal processing unit 6, which in the present exemplary embodiment is a train control device 8. The signal processing unit 6 is connected to the signal conditioning unit 4 via a train bus 10.

Each of the signal conditioning units 4 is designed to receive radio signals over four different radio transmission channels. To this end, each of the signal conditioning units 4 has four radio receive units 12, which are each equipped with an antenna 14. It would in principle be possible for each signal conditioning unit 4 (unlike in the present exemplary embodiment) to use a larger or smaller number of channels and accordingly have a larger or smaller number of radio receive units 12.

The radio receive units 12 are combined transmit and receive units (transceivers). They are thus designed both to receive and to transmit radio signals. Each of the radio receive units 12 is provided with a signal amplifier 16 for electronic amplification of a received radio signal and/or of a signal to be emitted.

In each of the signal conditioning units 4, a first one of its four radio receive units 12 uses Bluetooth, a second one of its four radio receive units 12 uses WLAN and a third one of its radio receive units 12 uses ZigBee as transmission channel, whereas the fourth one of its radio receive units 12 uses 866 MHz radio as its transmission channel.

Furthermore, the communications network 2 has a communications unit 18 for radio communication between the rail vehicle and a control center. The communications unit 18 has a radio receive unit 20 which is provided with an antenna 14 and takes the form of a combined transmit and receive unit (transceiver). Furthermore, the communications unit 18 is provided with a signal amplifier 16 for electronic amplification of a received radio signal and/or a signal to be transmitted. Moreover, the communications unit 18 is likewise connected to the train control device 8 via the train bus 10.

The communications network 2 further has a plurality of components which are arranged on rail vehicle trucks not shown in the figures. FIG. 1 shows by way of example components of the communications network 2 which are arranged on one of the trucks of the rail vehicle. These components are surrounded in FIG. 1 by a dash-dotted rectangle. The rail vehicle has the same components on each of its other trucks.

For each of the four wheels of the respective truck, the communications network 2 has an arrangement 22 of a plurality of sensors 24 (of which three sensors 24 are shown by way of example in FIG. 1), a signal amplifier 26, to which the sensors 24 are communicatively connected, for electronic signal amplification of sensor signals and a digitizer 28, which is communicatively connected to the latter signal amplifier 26, for digitization of the (amplified) sensor signals. For the sake of greater clarity, FIG. 1 shows only one of the four similar arrangements 22 of the respective truck.

The sensors 24 are designed to measure truck parameters, such as for example a wheel temperature, a wheel rotational speed or the like. In particular, the sensors 24 arranged on the respective wheel are each configured to measure different physical variables. It is however also possible for a plurality of the sensors 24 arranged on the respective wheel to be configured to measure the same physical variable, in particular for reasons of redundancy.

Moreover, on each truck, the communications network 2 has a multiplexer 30 which is communicatively connected on the input side to the arrangements 22 of sensors 24, signal amplifier 26 and digitizer 28.

The communications network 2 further comprises a transmit module 32 on each truck, to which the multiplexer 30 is connected communicatively on the output side and which is designed to transmit radio signals via four different radio transmission channels. To this end, the transmit module 32 has four radio transmit units 34 each with one antenna 14, wherein the radio transmit units 34 take the form of combined transmit and receive units (transceivers). A first one of these four radio transmit units 34 uses Bluetooth, a second one of these four radio transmit units 34 uses WLAN, a third one of these four radio transmit units 34 uses ZigBee and the fourth one of the four radio transmit units 34 uses 866 MHz radio as its transmission channel.

Furthermore, the communications network 2 comprises a reliable power supply 36, via which the transmit module 32 and the signal amplifier 26 of the respective truck are supplied with electrical power.

The description below describes, by way of example and with regard to a rail vehicle truck, how information generated using the sensors 24 is transferred to the signal processing unit 6.

Each of the sensors 24 generates a sensor signal at specified time intervals. The sensor signal of the respective sensor 24 contains a measured value detected by the sensor 24, time information about a measurement time of the measured value and the identifier of the sensor 24. The identifier allows the measured value to be assigned by the signal processing unit 6 to the associated sensor 24.

The individual sensor signals are amplified electronically by the signal amplifier 26 connected to the sensors 24 and digitized by the digitizer 28. The multiplexer 30 further respectively and in succession connects another one of its inputs to its outlet and thereby forwards the (amplified and digitized) sensor signals received at the respective input in succession to the transmit module 32.

From the received sensor signal, the transmit module 32 generates four primary signals in the form of radio signals, which each have the same useful information consisting of the measured value, the time information about the measurement time and the sensor identifier. Furthermore, using its four radio transmit units 34, the transmit module 32 transmits each of the primary signals via a separate one of said four different radio transmission channels (WLAN, Bluetooth, ZigBee, 866 MHz radio).

At least one of the above-stated signal conditioning units 4 in each case receives one of these four primary signals via at least one radio transmission channel.

Provided this one signal conditioning unit 4 in each case receives one of the primary signals via a plurality of radio transmission channels, this signal conditioning unit 4 determines the signal strengths of the primary signals and proceeds to use just that one of the primary signals for which the signal conditioning unit 4 identifies the greatest signal strength.

Said signal conditioning unit 4 generates a secondary signal from the primary signal. In the process, the primary signal is electronically amplified by the signal conditioning unit 4. The secondary signal contains the useful information of the primary signal, i.e. a measured value, time information about a measurement time of the measured value and a sensor identifier. The secondary signal additionally contains time information generated by the signal conditioning unit 4, namely the receive time of the primary signal (i.e. the time at which the signal conditioning unit 4 receives the primary signal), together with the identifier of the signal conditioning unit 4 as source address.

The signal conditioning unit 4 transfers the secondary signal via two different protocol layers of a protocol stack, namely via the "physical layer" and via the "network layer", to the signal processing unit 6. The train bus 10 is used for transfer.

The signal conditioning unit 4 transfers the secondary signal via the physical layer and via the network layer in the form of different protocol data units (assigned to the respective protocol layers) to the signal processing unit 6. The secondary signal is transferred bit-by-bit (i.e. coded in bits) via the physical layer and packet-by-packet (i.e. in the form of data packets) via the network layer to the signal processing unit 6.

The signal processing unit 6 furthermore compares the secondary signal useful information received via the physical layer with the secondary signal useful information received via the network layer. In the case of the useful information corresponding, the signal processing unit 6 uses one of the (in this case identical) items of useful information to monitor the truck parameter assigned to the sensor signal. The signal processing unit 6 accordingly processes this useful information. In the case of the useful information not corresponding, for example because at least one of the items of useful information has been corrupted in the course of transmission via one of the two protocol layers, the useful information is discarded.

If each of a plurality of the signal conditioning units 4 receives one of the four above-stated primary signals via at least one radio transmission channel, each of these signal conditioning units 4 handles the primary signal or the primary signals in a similar manner. In such a case, the signal processing unit 6 processes useful information of that secondary signal which the signal processing unit 6 receives first from one of said plurality of signal conditioning units 4.

The above-described operation is repeated in a similar manner for measured values recorded later. Furthermore, the information generated by the sensors 24 of the other trucks is transmitted in a similar manner to the signal processing unit 6.

The description of the following exemplary embodiment is limited primarily to the differences from the preceding exemplary embodiment, to which reference is made in relation to invariable features and functions. Elements which are substantially identical or which correspond to one another are, insofar as appropriate, denoted with the same reference signs and features which are not mentioned are carried over to the following exemplary embodiment without being described again.

Figure 2:
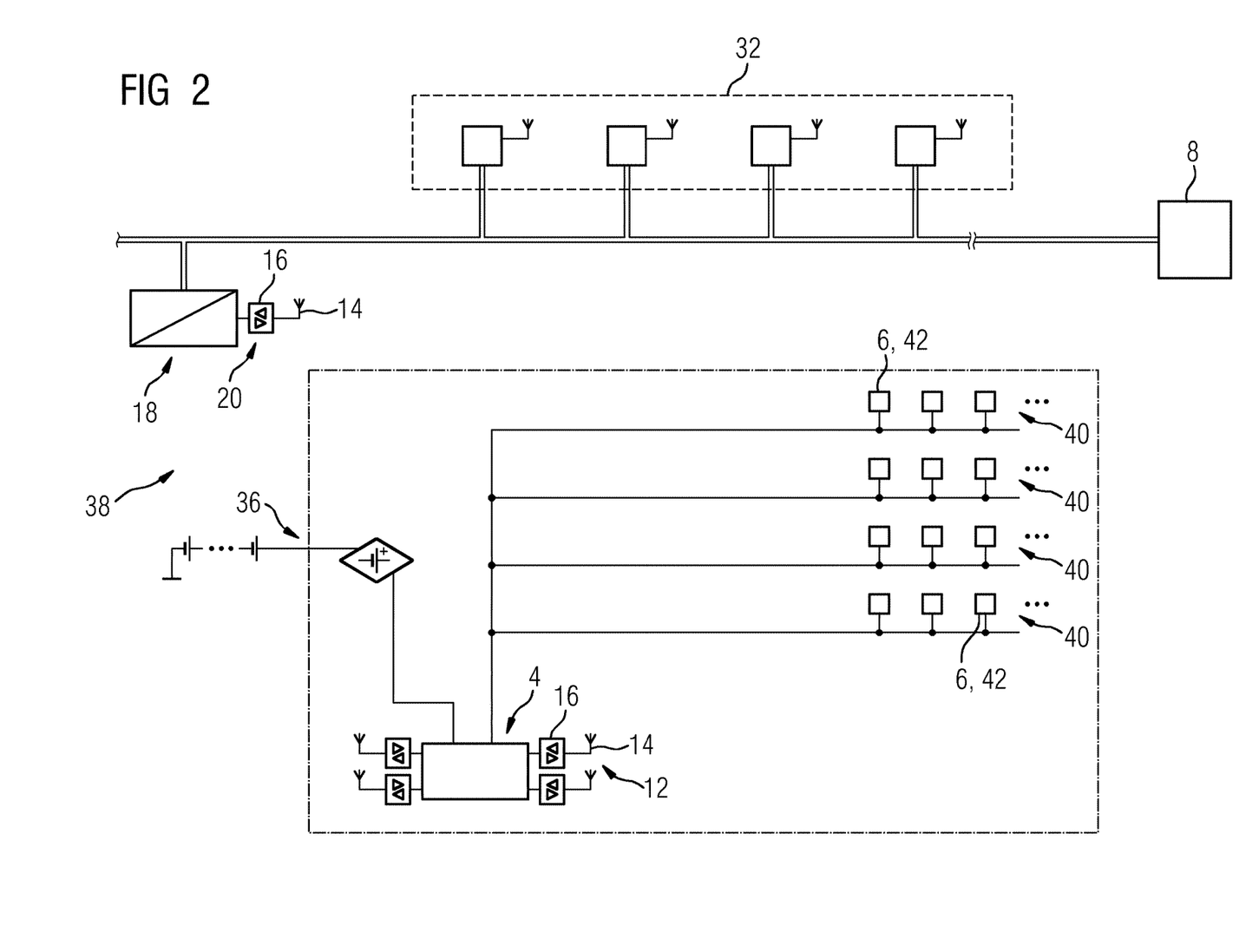
FIG. 2 shows a further communications network, which inter alia comprises a signal conditioning unit and a plurality of signal processing units configured as actuators.

FIG. 2 shows a schematic diagram of a further communications network 38. This communications network 38 is also a communications network of a rail vehicle.

This communications network 38 comprises a train control device 8. The communications network 38 further comprises a communications unit 18 for radio communication between the rail vehicle and a control center. The communications unit 18 is connected to the train control device 8 via a train bus 10.

Moreover, the communications network 38 has a transmit module 32, which is connected to the train control device 8 via the train bus 10. The transmit module 32 is designed to transmit radio signals via four different radio transmission channels. To this end, the transmit module 32 has four radio transmit units 34. A first one of these four radio transmit units 34 uses Bluetooth, a second one of these four radio transmit units 34 uses WLAN, a third one of these four radio transmit units 34 uses ZigBee and the fourth one of the four radio transmit units 34 uses 866 MHz radio as its transmission channel.

Moreover, the communications network 38 has a plurality of components which are arranged on rail vehicle trucks not shown in the figures. FIG. 2 shows by way of example components of the communications network which are arranged on one of the trucks of the rail vehicle. These components are surrounded in FIG. 2 by a dash-dotted rectangle. The rail vehicle has the same components on each of its other trucks.

For each of the four wheels of the respective truck, the communications network 38 has an arrangement 40 of a plurality of actuators 42 which are each capable of converting an electrical signal into a mechanical movement or into another physical variable, wherein, for the sake of greater clarity, FIG. 2 in each case shows just three actuators 42 from each actuator arrangement 40. The actuators 42 of the communications network 38 each represent a signal processing unit 6.

Moreover, the communications network 38 has a signal conditioning unit 4 on each truck, to which unit the actuators 42 are communicatively connected and which is designed to receive radio signals over four different radio transmission channels. To this end, the respective signal conditioning unit 4 has four radio receive units 12, which are each equipped with an antenna 14.

The radio receive units 12 are combined transmit and receive units (transceivers). Each of the radio receive units 12 is provided with a signal amplifier 16 for electronic amplification of a received radio signal and/or of a signal to be emitted.

A first one of these four radio receive units 12 uses Bluetooth, a second one of these four radio receive units 12 uses WLAN, a third one of these four radio receive units 12 uses ZigBee and the fourth one of the four radio receive units 12 uses 866 MHz radio as its transmission channel.

Furthermore, the communications network 38 has a reliable power supply 36, via which the signal conditioning unit 4 of the respective truck is supplied with electrical power.

The description below describes, by way of example, with regard to a rail vehicle truck, how information generated by the train control device 8 is transferred to one of the actuators 42.

The train control device 8 generates a control signal which contains a control command for one of the actuators 42. In addition, the control signal contains the identifier of that actuator 42 for which the control command is specified, together with the identifier of that signal conditioning unit 4 to which this actuator 42 is connected.

The train control device 8 transfers the control signal to the transmit module 32 via the train bus 10. Furthermore, from the received control signal, the transmit module 32 generates four primary signals in the form of radio signals, which each have the same useful information consisting of the control command and said two identifiers. Using its four radio transmit units 34, the transmit module 32 transmits each of the primary signals via a separate one of said four different radio transmission channels (WLAN, Bluetooth, ZigBee, 866 MHz radio).

In the case of at least one of the trucks, the respective signal conditioning unit 4 receives one of these primary signals via at least one radio transmission channel. Provided the signal conditioning unit 4 in each case receives one of the primary signals via a plurality of radio transmission channels, the signal conditioning unit 4 determines the signal strengths of the primary signals and proceeds to use just that one of the primary signals for which the signal conditioning unit 4 identifies the greatest signal strength.

The signal conditioning unit 4 electronically amplifies the primary signal. In addition, the signal conditioning unit 4 checks whether its identifier is the same as the signal conditioning unit identifier contained in the primary signal. If these two identifiers do not correspond, the signal conditioning unit 4 discards the primary signal. Otherwise, the signal conditioning unit 4 generates a secondary signal from the amplified primary signal which contains the same useful information as the primary signal.

The signal conditioning unit 4 further transfers the secondary signal via two different protocol layers of a protocol stack, namely via the "physical layer" and via the "network layer", in a conducted manner to the actuator 42 provided.

The signal conditioning unit 4 transfers the secondary signal via the physical layer and via the network layer in the form of different protocol data units (assigned to the respective protocol layers) to the actuator 42 provided. In the process, the secondary signal is transferred bit-by-bit (i.e.

coded in bits) via the physical layer and packet-by-packet (i.e. in the form of data packets) via the network layer to said actuator.

The actuator 42 furthermore compares the secondary signal useful information received via the physical layer with the secondary signal useful information received via the network layer. In the case of the items of useful information corresponding, the actuator 42 processes one of the (in this case identical) items of useful information in that the actuator 42 converts the secondary signal into a mechanical movement or another physical variable. In the case of the useful information not corresponding, on the other hand, the useful information is discarded.

The above-described operation is repeated in a similar manner for control signals generated later (by the train control device 8). Furthermore, control signals generated for other actuators 42 are transferred in a similar manner to the actuator 42 respectively provided.

Although the invention has been illustrated and described in detail with reference to the preferred exemplary embodiments, the invention is not restricted by the disclosed examples and other variations may be derived therefrom without going beyond the scope of protection of the invention.

The invention claimed is:

1. A method for information transmission in a communications network, the method comprising the following steps:
   receiving a primary signal over at least one transmission channel by using a signal conditioning unit;
   generating a secondary signal from the primary signal by using the signal conditioning unit; and
   transmitting the secondary signal via two different protocol layers to a signal processing unit by using the signal conditioning unit; and
   transmitting the secondary signal to the signal processing unit bit-by-bit via one of the two protocol layers and packet-by-packet via the other of the two protocol layers.

2. The method according to claim 1, which further comprises carrying out the step of using the signal conditioning unit to transmit the secondary signal to the signal processing unit as a first protocol data unit via one of the two protocol layers and as a second protocol data unit being different than the first protocol data unit via the other of the two protocol layers.

3. The method according to claim 1, wherein the at least one transmission channel is a wireless transmission channel.

4. The method according to claim 3, wherein the wireless transmission channel is a radio transmission channel.

5. The method according to claim 1, which further comprises using the signal conditioning unit to transmit the secondary signal in a wired manner to the signal processing unit.

6. The method according to claim 1, which further comprises using the signal conditioning unit to transmit the secondary signal over a bus or a bus system to the signal processing unit.

7. The method according to claim 1, wherein the step of generating the secondary signal from the primary signal includes signal amplification of the primary signal.

8. The method according to claim 1, wherein the signal processing unit is a train control device.

9. The method according to claim 1, wherein the signal processing unit is an actuator.

10. A method for information transmission in a communications network, the method comprising the following steps:
    receiving a primary signal over at least one transmission channel by using a signal conditioning unit;
    generating a secondary signal from the primary signal by using the signal conditioning unit; and
    transmitting the secondary signal via two different protocol layers to a signal processing unit by using the signal conditioning unit;
    comparing items of useful information of the secondary signal received via a first of the two protocol layers with items of useful information of the secondary signal received via a second of the two protocol layers by using the signal processing unit; and
    when the items of useful information correspond, processing one of the items of useful information and otherwise discarding the useful information by using the signal processing unit.

11. A method for information transmission in a communications network, the method comprising the following steps:
    receiving a primary signal over at least one transmission channel by using a signal conditioning unit;
    generating a secondary signal from the primary signal by using the signal conditioning unit; and
    transmitting the secondary signal via two different protocol layers to a signal processing unit by using the signal conditioning unit; and
    placing at least one item of time information generated by the signal conditioning unit in the secondary signal.

12. The method according to claim 11, which further comprises selecting the at least one item of time information as a receive time for the primary signal.

13. A method for information transmission in a communications network, the method comprising the following steps:
    receiving a primary signal over at least one transmission channel by using a signal conditioning unit;
    generating a secondary signal from the primary signal by using the signal conditioning unit; and
    transmitting the secondary signal via two different protocol layers to a signal processing unit by using the signal conditioning unit;
    generating the secondary signal by using a sensor; and
    including a measured value detected by the sensor together with time information about a measurement time in the primary signal.

14. A method for information transmission in a communications network, the method comprising the following steps:
    receiving a primary signal over at least one transmission channel by using a signal conditioning unit;
    generating a secondary signal from the primary signal by using the signal conditioning unit; and
    transmitting the secondary signal via two different protocol layers to a signal processing unit by using the signal conditioning unit;
    emitting respective primary signals from a transmit module over each of a plurality of different transmission channels;
    the primary signals emitted over the transmission channels corresponding with regard to their useful information; and
    generating the secondary signal from one of the primary signals by using the signal conditioning unit.

15. The method according to claim 14, wherein the different transmission channels are wireless transmission channels.

16. The method according to claim 14, which further comprises:
　using the signal conditioning unit to receive a plurality of primary signals from one transmit module, the plurality of primary signals corresponding in their time information;
　using the signal conditioning unit to receive each of the primary signals over a separate respective transmission channel; and
　using the signal conditioning unit to generate the secondary signal from at least one of:
　　one of the primary signals for which the signal conditioning unit identifies a greatest signal strength or
　　one of the primary signals which is received first by the signal conditioning unit.

17. The method according to claim 16, wherein the separate transmission channel is a wireless transmission channel.

\* \* \* \* \*